(12) United States Patent
Tang

(10) Patent No.: US 9,097,428 B2
(45) Date of Patent: Aug. 4, 2015

(54) BURNER ASSEMBLY

(75) Inventor: Haijiang Tang, Hunan (CN)

(73) Assignee: SAKURA SHUNDE CO., LTD., Foshan, Guangdong (CN)

( * ) Notice: Subject to any disclaimer, the term of this patent is extended or adjusted under 35 U.S.C. 154(b) by 680 days.

(21) Appl. No.: 13/413,642

(22) Filed: Mar. 6, 2012

(65) Prior Publication Data

US 2013/0233297 A1    Sep. 12, 2013

(51) Int. Cl.
*F24C 3/00* (2006.01)
*F24C 3/04* (2006.01)
*F24C 15/24* (2006.01)

(52) U.S. Cl.
CPC ............... *F24C 3/047* (2013.01); *F24C 15/24* (2013.01); *Y02B 40/166* (2013.01)

(58) Field of Classification Search
CPC .......... F24C 15/28; F24C 15/24; F24C 15/22; F24C 15/36; F24C 15/12; F24C 3/047; F24C 3/06; F24C 3/062; F23D 2900/14064; F23D 2203/005

USPC ................ 126/39 K, 37 A, 228; 431/328
See application file for complete search history.

(56) References Cited

U.S. PATENT DOCUMENTS 1,376,241 A * 4/1921 Wright .................. 126/214 D

FOREIGN PATENT DOCUMENTS

AU          2010100251 A4 *  4/2010

* cited by examiner

*Primary Examiner* — Kenneth Rinehart
*Assistant Examiner* — Jason Lau
(74) *Attorney, Agent, or Firm* — Li & Cai Intellectual Property (USA) Office

(57) ABSTRACT

The instant disclosure relates to a burner assembly, which includes a burner, at least one support, and a cover. The burner has a main body. A heating member and a gas intake are disposed on the top portion and side portion of the main body, respectively. The cover is disposed above the burner through the support. The cover can resist high temperature, trap heat, radiate heat, and be cleaned with ease to reduce heat loss and raise heating efficiency. Thus, the burner assembly is energy efficient.

5 Claims, 3 Drawing Sheets

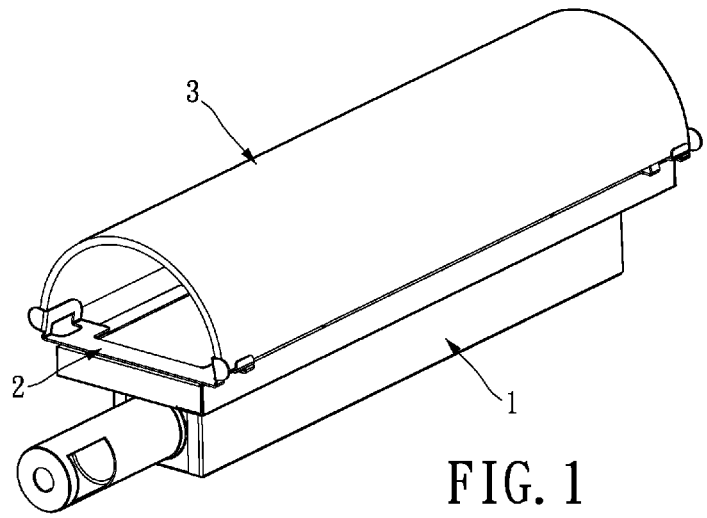
FIG. 1
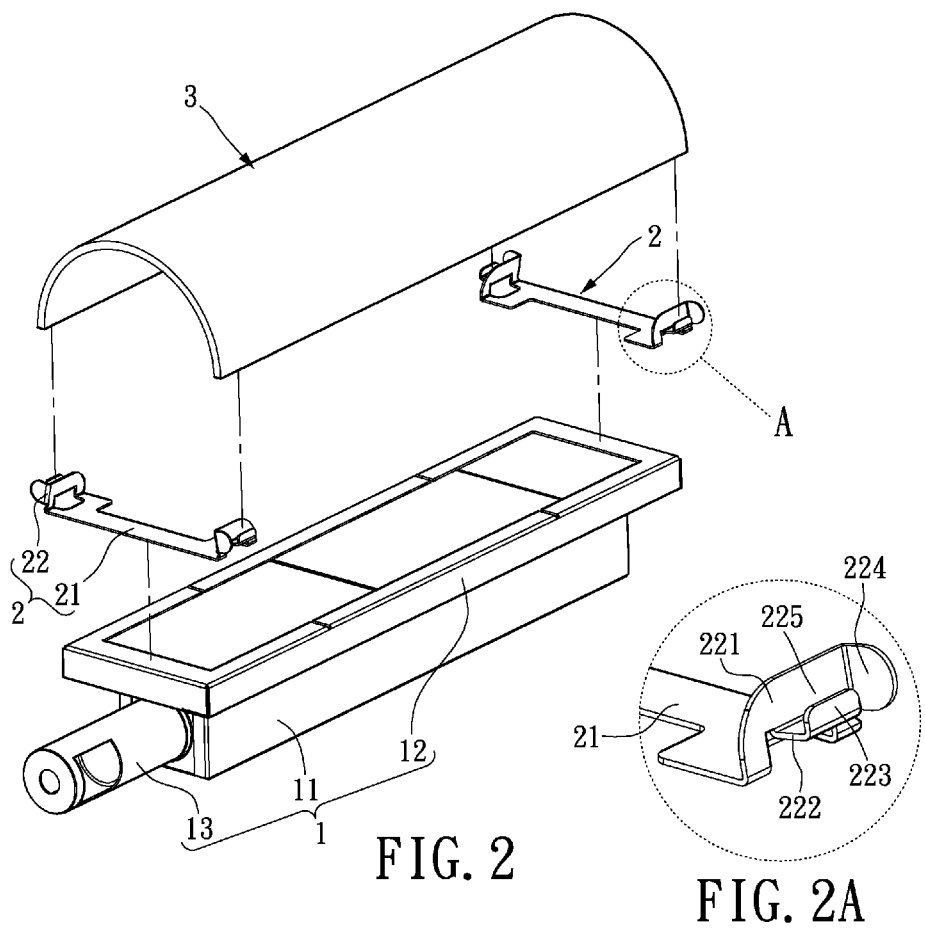
FIG. 2
FIG. 2A

BURNER ASSEMBLY

BACKGROUND OF THE INVENTION

1. Field of the Invention

The instant disclosure relates to a burner assembly; more particularly, to a cover-mounted type burner assembly.

2. Description of Related Art

Conventional cooking stoves and barbecue grills that use burners for heating loose much heat during the cooking process. Thus, the heating efficiency is low and much energy is wasted. In addition, flames produced by the burners tend to scorch the food and cooking utensils. The burnt food poses health risk, and the scorched cooking utensils are difficult to clean while presenting pollution issue. While in use, the burner itself is prone to be contaminated by foreign objects such as grease from the food. The stained burner is difficult to clean and its service life may be shortened. For the users, these issues reduce the overall value of the cooking device.

To address the above issues, the inventor strives via industrial experience and academic research to present the instant disclosure, which can effectively improve the limitations described above.

SUMMARY OF THE INVENTION

The object of the instant disclosure is to provide a cover-mounted burner assembly, which can reduce heat loss and raise the heating efficiency. The burner assembly is also able to prevent the flames from scorching the food, pans, and pots, thus eliminating the health and pollution issues. The burner assembly is also able to prevent from being contaminated by foreign objects in resolving the issue of shortened lifespan.

To achieve the above object, the burner assembly of the instant disclosure comprises: a burner having a main body, where a heating member is disposed on the top portion of the main body, while a gas intake is arranged on a side portion of the main body; and a cover disposed above the burner.

The burner assembly of the instant disclosure has the following advantages. The cover is capable of trapping and radiating heat, where heat loss can be reduced while raising the heating efficiency. Thus, energy-saving can be achieved. The cover also serves to separate the flame from the food and cooking utensils, thereby preventing the food and cooking utensils from being scorched. Thus, health risk and pollution issues due to scorched food and cooking utensils can be eliminated. Moreover, the cover shields the burner from being contaminated by foreign objects such as food grease, thus resolving the issue of shortened service life.

BRIEF DESCRIPTION OF THE DRAWINGS

FIG. 1 shows an assembled view of a burner assembly for a first embodiment of the instant disclosure.

FIG. 2 shows an exploded view of the burner assembly in FIG. 1.

FIG. 2A shows an enlarged view for a portion of the burner assembly in FIG. 2.

DETAILED DESCRIPTION OF EMBODIMENTS

Figure 5:
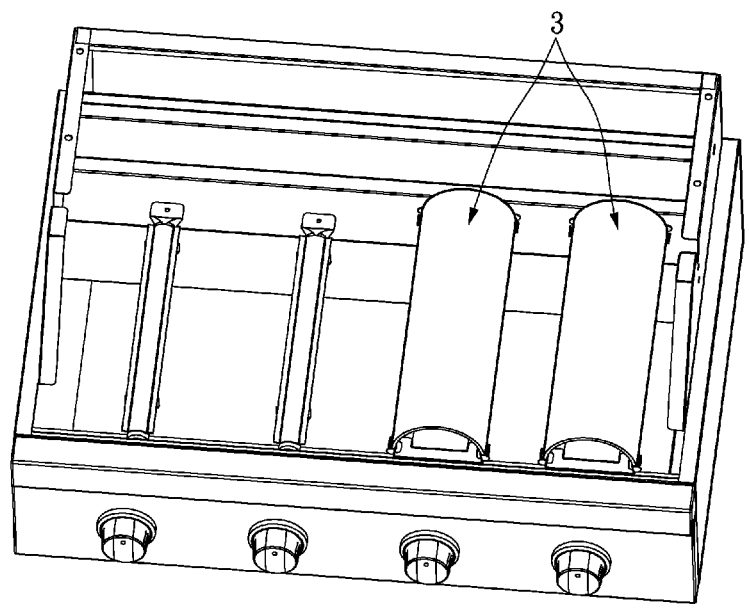
FIG. 5 shows a perspective view of the burner assembly in FIG. 1 while in use.

Please refer to FIGS. 1, 2, and 5, which show a burner assembly for a first embodiment of the instant disclosure. The burner assembly comprises a burner 1, at least one support 2, and a cover 3.

The burner 1 includes a main body 11, a heating member 12, and a gas intake 13. The gas intake 13 is connected to a side portion of the main body 11 for guiding flammable gas, such as liquefied petroleum gas (LPG) or natural gas, into the burner 1. The gas intake 13 can be a rubber tubing or a metal tubing made of cast iron. However, the material used to construct the gas intake 13 shall depend on specific operational requirement or practical needs and not be limited. For the orientation shown in the figures, the heating member 12 is disposed on the top portion of the main body 11. Functionally, the heating member 12 can ignite the burner 1 and mix flammable gases. For the instant embodiment, the burner 1 is square shaped. Since the main body 11, the heating member 12, and the gas intake 13 of the burner 1 are well known by those skilled in the art, no further description is provided herein.

Please refer to FIGS. 2 and 2A. The support 2 has a base portion 21 and at least a pair of first connecting portions 22. The base portion 21 is disposed on the burner 1, and the first connecting portions 22 are connected to opposite ends of the base portion 21. The cover 3 is mounted on the first connecting portions 22 of the support 2. For the instant embodiment, two supports 2 are utilized with each support 2 having a pair of first connecting portions 22. The two supports 2 are mounted on the top surface of the heating member 12 at opposite ends thereof Each of the first connecting portions 22 has an inner blocking piece 221, a bottom piece 222, an outer blocking piece 223, and a side blocking piece 224. The base portion 21 is strip-shaped with the inner blocking pieces 221 extend upwardly from opposite ends thereof The bottom piece 222 extends horizontally from one side of the inner blocking piece 221. The outer blocking piece 223 extends upwardly from the end of the bottom piece 222. The outer blocking piece 223 is parallel to the inner blocking piece 221. The side blocking piece 224 is extended from one side of the inner blocking piece 221 normal to the bottom piece 222. A receiving space 225 is cooperatively defined by the inner blocking piece 221, the bottom piece 222, the outer blocking piece 223, and the side blocking piece 224.

As shown in FIGS. 1, 2, and 2A, the cover 3 is mounted above the burner 1 through the supports 2. For the instant embodiment, the cover 3 is open and semi-cylindrical shaped. The ends of the edge portions of the cover 3 along the direction of the long axis thereof are accommodated by the receiving spaces 225 of the supports 2. The inner blocking pieces 221, the outer blocking pieces 223, and the side blocking pieces 224 restrict the cover 3 from displacing horizontally in the receiving spaces 225.

Figure 3:
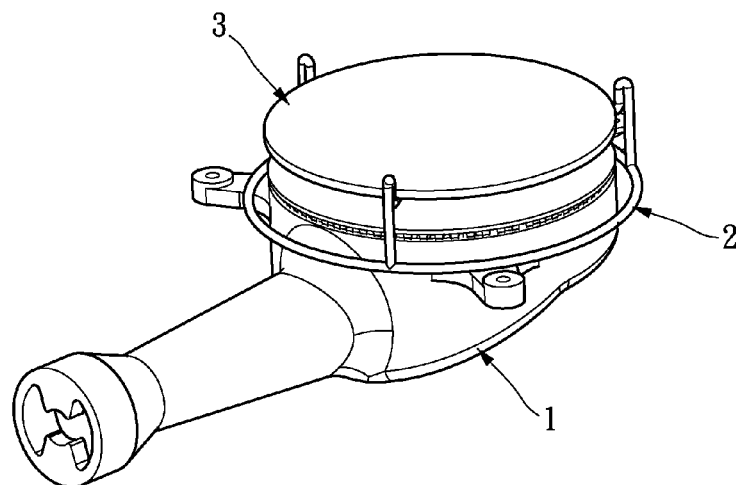
FIG. 3 shows an assembled view of a burner assembly for a second embodiment of the instant disclosure.
Figure 4:
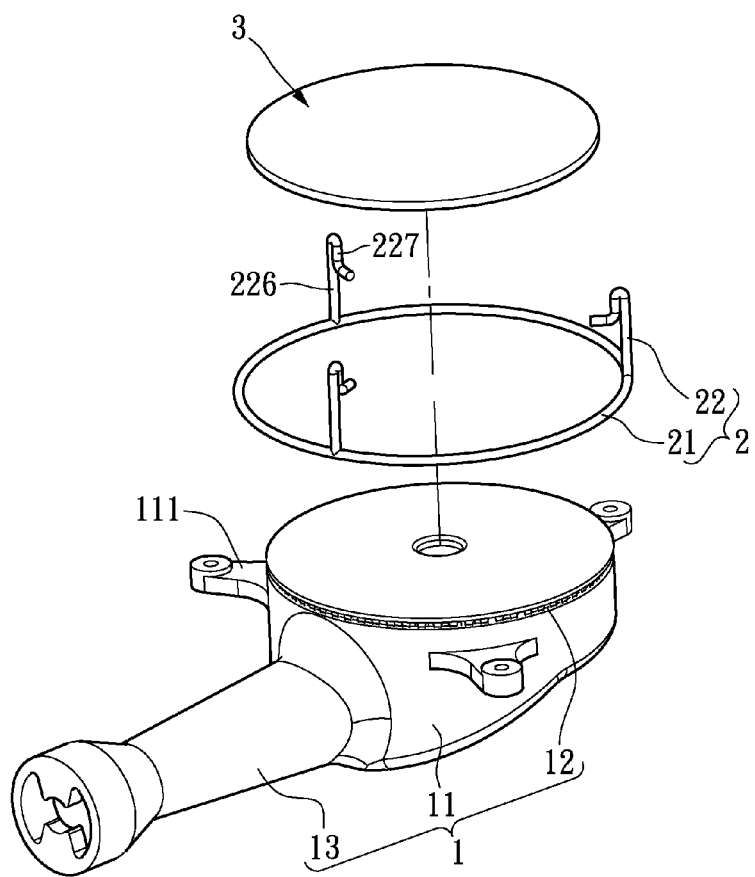
FIG. 4 shows an exploded view of the burner assembly in FIG. 3.
Figure 6:
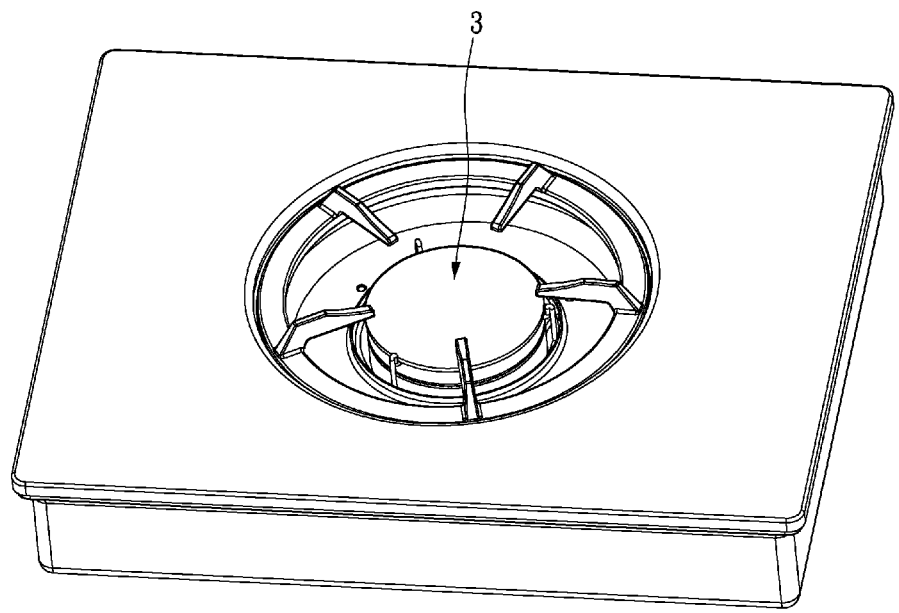
FIG. 6 shows a perspective view of the burner assembly in FIG. 2 while in use.

Please refer to FIGS. 3, 4, and 6, which show a burner assembly for a second embodiment of the instant disclosure. In principle, the instant embodiment is similar to the previous embodiment. The main difference being the burner 1 of the instant embodiment is circular-shaped instead. Accordingly, the cover 3 is disc-shaped, and the support 2 is annular shaped disposed on the main body 11 of the burner 1.

Moreover, for the instant embodiment, the main body 11 has three protruding portions 111 extending outwardly therefrom.

The number of the supports 2 is one, and the support 2 has the base portion 21 and three first connecting portions 22. The support 2 is mounted on the protruding portions 111 of the burner 1. Each of the connecting portions 22 has a support member 226 and a holding member 227. The base portion 21 is annular shaped and disposed on the protruding portions 111. The support members 226 are formed extendingly from the base portion 21, where the L-shaped holding member 227 is formed bendingly at the end of support member 226.

The cover 3 is disposed above the burner 1 through the support 2. For the instant embodiment, the cover 3 is disc-shaped. The cover 3 is disposed on the support 2 and retained securely by the holding members 227.

The cover 3 of the instant disclosure is made of a material that can resist high temperature, trap heat, radiate heat, and be cleaned with ease, such as fused quartz. The cover 3 may be semi-cylindrical, circular, oval, or panel-shaped. However, the shape of the cover 3 shall depend on specific operational requirement or practical needs and not be limited.

The disclosed burner 1 herein refers to a device capable of mass producing light and heat due to oxidation between a flammable gas and oxygen under a given condition. For example, the burner 1 may be any type of burner used for home cooking stove or BBQ grill such as infrared burner, stainless burner, cast copper burner, or cast iron burner. The burner 1 may be square, circular, or oval-shaped. The type and shape of the burner 1 are not restricted.

It is worth noting the shape and mounting means of the support 2 are not restricted. The support 2 may be replaced by any article that has similar function.

For advantages, the cover 3 can trap and radiate heat to reduce heat loss and increase heating efficiency. Thus, the burner assembly of the instant disclosure is energy efficient.

The cover 3 also serves to separate the flame from directly contacting the food or cooking utensils. Thus, the food and cooking utensils can be prevented from being scorched, and the associated health and pollution issues may be alleviated.

Moreover, the cover 3 shields the burner 1 from being contaminated by foreign objects such as grease dripping from the food. Thus, the issue of shortened lifespan due to stained burner can be eliminated. The overall value of the burner can be increased and the burner can be replaced less frequently to save cost.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A burner assembly, comprising:
   a burner having a main body, wherein a heating member is disposed on the main body and a gas intake is disposed on one side of the main body
   a cover arranged above the burner; and
   at least one support, wherein the support has a base portion and at least two oppositely arranged connecting portions, wherein the base portion is disposed on the burner and the connecting portions are connected to opposite ends of the base portion;
   wherein each of the connecting portions has an inner blocking piece, a bottom piece, an outer blocking piece, and a side blocking piece, wherein the bottom piece extends horizontally from one side of the inner blocking piece, the outer blocking piece extends upwardly from the end of the bottom piece, the outer blocking piece is parallel to the inner blocking piece, the side blocking piece is extended from one side of the inner blocking piece normal to the bottom piece, and a receiving space is cooperatively defined by the inner blocking piece, the bottom piece, the outer blocking piece, and the side blocking piece;
   wherein ends of the cover are accommodated by the receiving spaces, and wherein the inner blocking pieces, the outer blocking pieces, and the side blocking pieces restrict the cover from displacing horizontally in the receiving spaces.

2. The burner assembly of claim 1, wherein the support is mounted on the heating member of the burner.

3. The burner assembly of claim 1, wherein the support is mounted on the main body of the burner.

4. The burner assembly of claim 1, wherein the cover is semi-cylindrical, circular, curve, or panel-shaped.

5. The burner assembly of claim 1, wherein the burner is an infrared burner, stainless steel burner, cast copper burner, or a cast iron burner.

* * * * *